Dec. 15, 1936.　　　C. ANDERSON　　　2,063,973
MEASURING DEVICE
Filed March 22, 1934
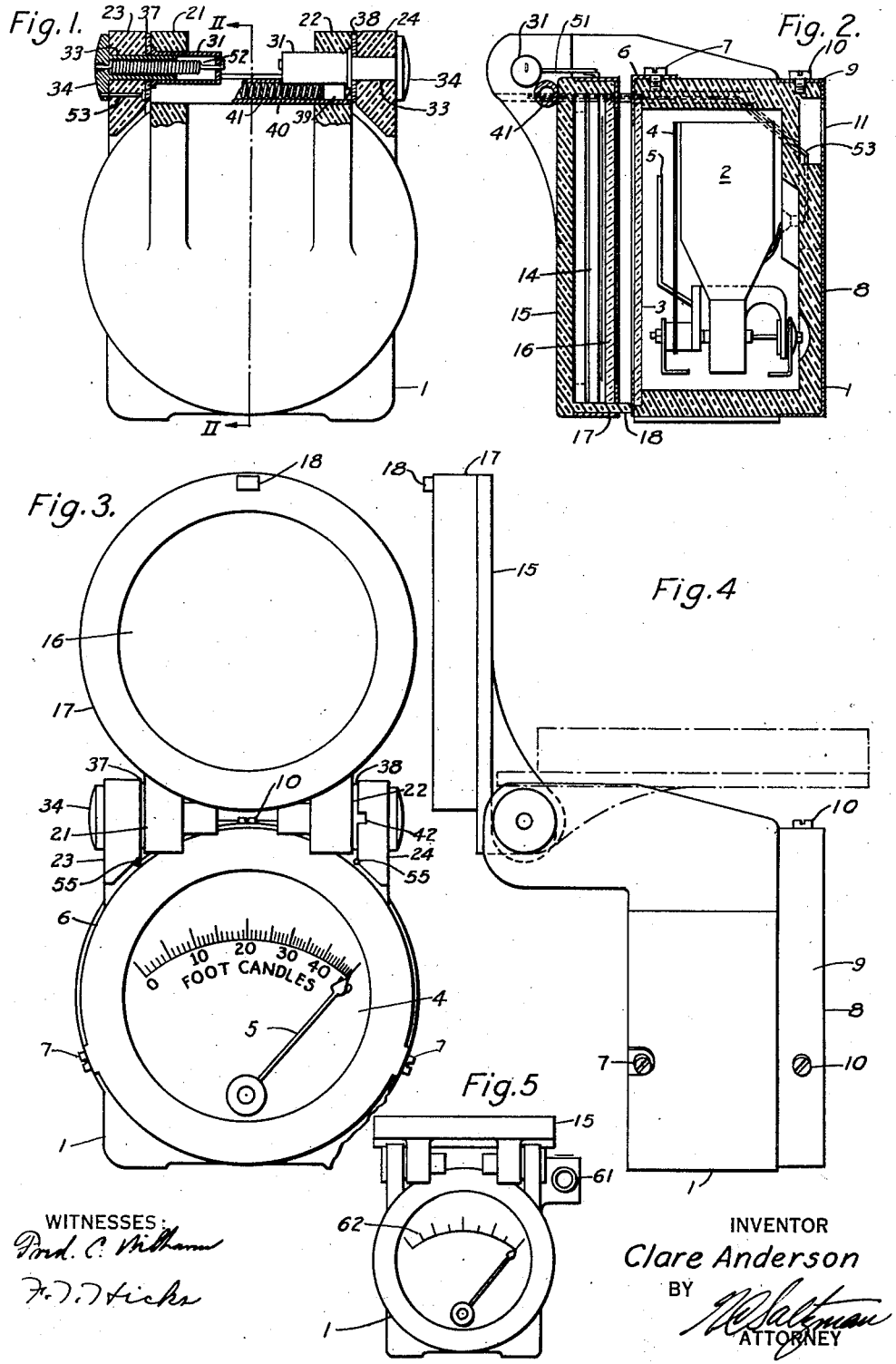
WITNESSES:
INVENTOR
Clare Anderson
BY
ATTORNEY Patented Dec. 15, 1936

2,063,973

UNITED STATES PATENT OFFICE 2,063,973

MEASURING DEVICE

Clare Anderson, Verona, N. J., assignor to Westinghouse Electric & Manufacturing Company, East Pittsburgh, Pa., a corporation of Pennsylvania Application March 22, 1934, Serial No. 716,920

1 Claim. (Cl. 88—23)

My invention pertains to a photometer and more particularly to a portable light intensity meter.

It is an object of my invention to provide a portable light intensity meter which will be compact, rugged, self-protecting, and adaptable to measure the light intensity at various angular positions relative to the fact of the indicating meter.

It is a further object of my invention to provide a photometer comprising a meter and a photo-cell unit so combined that the photo-cell may be closed over the meter to protect both elements when not in use and may be opened to various angular positions for making observations of light intensity in various directions.

The invention itself, however, both as to its organization and its method of utilization, together with additional objects and advantages thereof, will best be understood from the following description of a specific embodiment, when read in conjunction with the accompanying drawing, in which:

Figure 1 is a front elevational view of my invention showing the photo-cell member in closed protecting relation over the meter;

Fig. 2 is a sectional view on line II—II thereof;

Fig. 3 is a front elevational view showing how my photometer appears when the photo-cell cover is opened to expose the light-sensitive surface and the meter dial in parallel relation;

Fig. 4 is a side elevational view thereof; and

Fig. 5 is an elevational view of a modification thereof.

Referring more specifically to the drawing, my device comprises a meter housing 1 which supports and encloses a sensitive electro-responsive meter movement 2, such as a micro-ammeter, which may be of the permanent magnet moving coil type of instrument known as the D'Arsonval movement. The housing 1, which is open at one side, may be made of any suitable moulded insulation composition such as a phenolic condensation product, and the instrument movement 2 is secured in place in any suitable manner.

The open side of the meter housing is closed by a glass 3 through which the dial 4 and pointer 5 of the micro-ammeter 2 may be observed. A clamp ring 6 is secured over the open edge of the housing 1 by suitable screws 7 and serves to hold the glass 3 in position. The rear of the housing is protected by a metallic cover member 8 having an inturned rim 9 which fits over the peripheral edge of the housing and is secured in place by suitable screws 10. An aperture 11 may be provided in the rear cover member 8 whereby it may be conveniently supported on the head of a nail or other member, in storage, or for use in the home or office.

The light sensitive element or photo-cell used in my photometer is of the voltaic type and supplies sufficient current to directly operate the indicating instrument 2 in accordance with the intensity of light thereon. There are various known light sensitive devices of this character such as the copper oxide surface and others, but I prefer to utilize a light sensitive surface such as that disclosed in the copending application, Serial No. 578,399, of E. D. Wilson, filed December 1, 1931.

In my device, the photo-cell light sensitive surface is preferably of flat disk 14 like formation, and it is mounted in a flat open faced circular casing 15 of moulded material. A glass 16 is secured over the open face of the photo-cell casing 15 by means of a metallic clamping rim 17 which fits closely over the edge of the casing and secured thereto in any suitable manner. A stop stud 18 extends from the rim of the casing 15 through an aperture in the glass clamping rim 17.

The moulded photo-cell casing is also provided with a pair of integral laterally projecting pivot arms 21 and 22 which interfit between a pair of brackets 23 and 24 which are integral with and extend forward from the side of the moulded meter housing 1. These are pivotally joined by hollow pivots, each comprising a pair of interfitting sleeves, as shown on the sectioned pivot of Fig. 1. The larger sleeve 31, which is closed at one end and has a laterally projecting flange around the open end, extends through an orifice in each arm 21 and 22 of the photo-cell casing. The smaller sleeve 33 is closed by a large head 34 on one end and is open at the other end.

After the photo-cell casing arms 21 and 22 are placed in interfitting position between the brackets 23 and 24, the smaller sleeves 33 are forced through cooperative apertures in the brackets 23 and 24 with their open ends extending into the larger sleeves 31, which are embedded in the arms 21 and 22 of the photo-cell casing, as shown. The smaller sleeves fit snugly in the bracket apertures, and, extending into the larger sleeves in the photo-cell casing arms, provide bearings for pivotally supporting the light sensitive element on the meter housing.

The space between the brackets and the arms of the photo-cell is taken up by washers 37 and 38. One of the washers 37 may be of some composition material, but the other 38 is of metal and is provided with indentations for receiving the rounded nose of a spring pressed plunger 39 slidably pressed by a spring 40 in a tubular guide member 41 extending between the photo-cell arms 21 to latch the photo-cell unit in various positions. This indented washer 38 is secured from rotation by an anchor lug 42 which is bent over into a depression on the upper face of the bracket 24.

As the photo-cell unit is turned relatively to the meter housing, the spring pressed plunger 39 enters the depressions in the surface of the washer 38, thereby latching the photo-cell unit in as many different positions as there are depressions.

In the preferred form of my device I provide three latching depressions at spaced positions about the washer. One of these is so located that the photo-cell unit may be latched in closed protecting relation over the meter with the stop stud 18 abutting the housing, as shown in Figs. 1 and 2. The other depressions in the surface of the washer are so disposed that the photo-cell unit may be latched open, with the light sensitive surface either parallel or normal to the meter dial, as shown in Fig. 4 in full or in dot and dash lines, respectively.

This arrangement of the photo-cell and indicating instrument makes a very compact portable instrument which in its preferred form has closed dimensions of 2½×2¾×2½ inches and a weight of only ten ounces, and which is fully self-protecting when not in use.

Electrically conductive connection is established between the pivoted photo-cell and the instrument 2 by means of a pair of conductors 51 which extend from the light sensitive element and are secured, as by soldering, to the larger pivot sleeves 31, one of which is clearly shown in Figs. 1 and 2.

For the purpose of establishing direct low resistance electrical connection uninfluenced by the sliding contact between the two concentric sleeves 31 and 33 of each pivot, a coiled conductor 52 is disposed within each of the hollow pivot sleeves with one end secured, as by soldering, to one sleeve and the other end similarly secured to the other sleeve, as shown in Fig. 1. This connection is readily established when the instrument is assembled by fishing the ends of the conductor 52 through apertures in the closed ends of the sleeves and soldering them on the outer surfaces thereof.

Each of the meter conductors 53 is similarly secured into the outer caps 34 of each of the smaller pivot sleeves 33 and passes through an aperture in the stationary bracket 23 and 24 of the meter housing, thence down a narrow groove along the side of each bracket 23 and 24, and into the meter housing 1 through orifices 55 at the inner side of the foot of the bracket. As shown in Fig. 2, the meter conductor 53 may be conveniently extended to the rear of the meter housing through a suitable groove or open space, conveniently provided in the moulded material, and thence to the moving coil of the instrument 2.

Direct uninterrupted conductive connection is thus provided between the pivoted photo-cell unit and the indicating instrument, without external wires which might be damaged or which might interfere with the movements of the photo-cell unit to its different positions.

When measuring vertical intensities of light on disks, tables, work benches, etc., the hinged photo-cell provides accurate indications, since errors caused by the observer shading the photo-cell are avoided. This is accomplished by standing the device on its front edge, and turning the photo-cell unit to its 90 degree position, as shown in dot and dash lines in Fig. 4. The readings are then taken along the horizontal while the cell is directed to the vertical.

Horizontal surveys of illumination may also be taken with the photo-cell turned to its 90 degree position. This is accomplished by holding the instrument at waist level with the dial of the instrument in a horizontal plane for convenient observation while turning the photo-cell toward the various horizontal positions from which the light intensity is to be observed.

The photo-cell 14 may be turned parallel to the meter dial 4 when measuring light from a single source or under any such conditions, that the observer will not shade light sensitive surface. When the instrument is not in use, the photo-cell casing 15 is closed down over the meter housing 1, thereby fully protecting the photo-cell and instrument dial glass against breakage, while also preventing accidental exposure to intense light which might exceed the range of the instrument.

My invention may also be readily utilized as an exposure meter. For this purpose, a view finder 61 of the reflecting type is preferably mounted on one side of the meter housing 1, as shown in Fig. 5, to facilitate making the observations, and it is a great convenience to provide a special exposure scale on the meter. By observing the desired view in the view finder 61 the photographer turns the casing 15 accurately toward the view to be photographed, and an indication of the intensity of illumination is thus readily obtained. The photographer is thereby guided to accurately select the proper exposure. If the instrument 2 is provided with proper scales 62 the exposure may be directly indicated thereby eliminating computations.

It will be apparent that I have provided self-contained pocket sized portable photometers which are normally closed together in self protecting relation and which may be readily opened up and adjusted for making measurements of light intensities at various angles of incidence relative to the dial of the instrument.

Although I have shown and described certain specific embodiments of my invention, in compliance with the statutes, my invention is not to be restricted except as is necessitated by the prior art and the spirit of the appended claim.

I claim as my invention:

In combination in a portable photometer, an electric meter, a meter housing of moulded insulation material having an integral bracket member extending therefrom, a photo-cell, a photo-cell casing of moulded insulation material having an integral arm extending therefrom, a bearing for pivotally securing said arm to said bracket comprising a pair of hollow metal sleeves disposed in concentric relation, and conductive means between said meter and said photo-cell including a flexible conductor disposed in said hollow sleeves and having one end soldered to one sleeve and the other end soldered to the other sleeve whereby a direct conductive connection is provided through said hollow bearing sleeves.

CLARE ANDERSON.